US012744658B2

(12) United States Patent
Zyskind et al.

(10) Patent No.: US 12,744,658 B2
(45) Date of Patent: Sep. 22, 2026

(54) SYSTEM AND METHOD FOR SECURE DECRYPTION USING MULTI-PARTY COMPUTATION

(71) Applicant: FHE Labs Ltd, Tel Aviv (IL)

(72) Inventors: Guy Zyskind, Ganei Yehuda (IL); Doron Zarchy, Rehovot (IL); Max Leibovich, Ramla (IL)

(73) Assignee: FHE Labs Ltd, Tel Aviv (IL)

( * ) Notice: Subject to any disclaimer, the term of this patent is extended or adjusted under 35 U.S.C. 154(b) by 0 days.

(21) Appl. No.: 19/407,680

(22) Filed: Dec. 3, 2025

(65) Prior Publication Data

US 2026/0163716 A1 Jun. 11, 2026

Related U.S. Application Data

(60) Provisional application No. 63/729,687, filed on Dec. 9, 2024.

(51) Int. Cl.
*H04L 9/40* (2022.01)
*H04L 9/00* (2022.01)

(52) U.S. Cl.
CPC .......... *H04L 9/008* (2013.01); *H04L 63/0428* (2013.01)

(58) Field of Classification Search
None
See application file for complete search history.

(56) References Cited

U.S. PATENT DOCUMENTS

2020/0295946 A1* 9/2020 Velikevitch ............. H04L 9/085
2021/0409215 A1* 12/2021 Sherkin ................. H04L 9/3026
2023/0361986 A1* 11/2023 Genise .................... G06F 21/72

FOREIGN PATENT DOCUMENTS

CN 120185801 A * 6/2024 ............... H04L 9/32
WO WO2024228005 11/2024
WO WO-2025099730 A1 * 5/2025 ........... H04L 9/3255

OTHER PUBLICATIONS

Dahl, Morten et al.; "Noah's Ark: Efficient Threshold-FHE Using Noise Flooding"; https://eprint.iacr.org/2023/815; published in Cryptology ePrint Archive on Oct. 17, 2023.

(Continued)

*Primary Examiner* — Nelson S. Giddins
(74) *Attorney, Agent, or Firm* — PEARL COHEN LLP

(57) ABSTRACT

A system and method for secure decryption of an encrypted message, including: by each computer system of a plurality of computer systems, computing a decryption share of the encrypted message using a private share of a secret decryption key; by each computer system, computing a modified decryption share by removing a noise share from the decryption share; and recovering, by one or more of the computer systems, a decryption or plaintext of the encrypted message by aggregating the modified decryption shares without exposing or transmitting the noise shares or noise components between computer systems. In some embodiments, the removal of the noise share may include modular reduction operations, where each computer system masks its respective decryption share to produce a masked share, and where outputs from a plurality of lookup tables are aggregated based on the masked shares using a secure multi-party computation (MPC) protocol.

20 Claims, 7 Drawing Sheets

(56) References Cited

OTHER PUBLICATIONS

Dahl, Morten et al.; "Noah's Ark: Efficient Threshold-FHE Using Noise Flooding"; https://dl.acm.org/doi/10.1145/3605759.3625259; published on Nov. 26, 2023 in WAHC '23: Proceedings of the 11th Workshop on Encrypted Computing & Applied Homomorphic Cryptography; pp. 35-46.
Gilad Asharov et al: "Multiparty Computation with Low Communication, Computation and Interaction via Threshold FHE", IACR International Association For Cryptologic Research; vol. 20120611:173056; published on Nov. 14, 2011, pp. 1-48.
Boneh Dan et al: "Threshold Cryptosystems from Threshold Fully Homomorphic Encryption"; published Jul. 15, 2018; Austin TX, USA; Lecture notes in computer science; Springer, Berlin, Heidelberg, pp. 565-596.
Antoine Urban et al: "Robust Multiparty Computation from Threshold Encryption Based on RLWE"; IACR International Association For Cryptologic Research; vol. 20240815:073254; published on Aug. 15, 2024, pp. 1-48.

* cited by examiner

- Enc$_{sk}(\mu)=(a,b)$ (402, 404)
  - uniform random $a = (a_1, \ldots a_n)$
  - $b = (a \cdot sk + \Delta\mu + e)$, where e is a small noise, and $\Delta$ is a scaling factor
- PartDec(ct, $sk_i$): $z_i = b - a \cdot sk_i = (\mu + e)_i$ (406)
- $= b - a \cdot [sk] = [\mu + e] ==> R(\sum z_i) = R(\mu + e)$.

Totally insecure!

| z' | 0 | 1 | 2 | 3 | 4 | 5 | 6 | 7 |
|---|---|---|---|---|---|---|---|---|
| LTZ(z'-r), r=3 | 1 | 1 | 1 | 0 | 0 | 0 | 0 | 0 |

SYSTEM AND METHOD FOR SECURE DECRYPTION USING MULTI-PARTY COMPUTATION

PRIOR APPLICATION DATA

The present application claims benefit from prior U.S. Provisional Application 63/729,687, filed on Dec. 9, 2024, and entitled "SIMULATION-SECURE THRESHOLD FHE DECRYPTION WITH REAL-TIME PERFORMANCE", being incorporated by reference herein in its entirety.

FIELD OF THE INVENTION

The present invention relates generally to secure computerized decryption, and more specifically to decryption using multi-party computation (MPC) to prevent leaking of information.

BACKGROUND OF THE INVENTION

Modern encryption schemes enable secure computation on encrypted data without revealing the underlying message or plaintext. However, when decrypting such data-especially in threshold settings where multiple parties hold shares of a secret key-care must be taken to prevent information leakage. A common vulnerability arises from the presence of noise terms embedded in the ciphertext. If the noise is not properly masked or removed before revealing decryption shares to recover the original message or plaintext, adversaries may infer sensitive information about the secret key, which may compromise the security of the system.

There is a need for secure, yet computationally economical decryption protocols that ensure that noise is accounted for without exposing its value or structure.

SUMMARY

Some embodiments may provide a system and method for secure decryption of an encrypted message or cyphertext. Some embodiments may: by each computer system of a plurality of computer systems, compute a decryption share of the encrypted message using a private share of a secret decryption key; by each computer system, compute a modified decryption share by removing a noise share from the decryption share; and recover, by one or more of the computer systems, a decryption or plaintext of the encrypted message by aggregating the modified decryption shares without exposing or transmitting the noise shares or noise components between computer systems.

In some embodiments, the removal of the noise share may include or involve modular reduction operations, where each computer system masks its respective decryption share to produce a masked share, and where outputs from one or more lookup tables are aggregated based on the masked shares using a secure multi-party computation (MPC) protocol.

In some embodiments, the one or more lookup tables may be generated by decomposing a Less-Than-Zero (LTZ) function or table, and may include or represent shares of sign function outputs.

Some embodiments may be used on encrypted messages or ciphertexts generated using a Learning With Errors (LWE) encryption scheme.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments of the invention may provide a secure decryption process that enables multiple computer systems to collaboratively decrypt encrypted data without revealing sensitive terms and/or intermediate values (including, e.g., noise components or terms within decryption shares of the decrypted message that may be used to learn/reverse-engineer the secret-shared decryption key). Some embodiments may improve computerized cryptography technology by ensuring that noise terms—used to protect the ciphertext (as part of some encryption schemes such as, e.g., Learning- With-Errors)—are removed in a privacy-preserving manner using modular reduction and secure comparisons, preventing leakage of information about secret keys or plaintext. In some embodiments, this may be achieved by leveraging multiparty computation (MPC) and utilizing preprocessed lookup tables to allow secure decryption in real world applications (where, e.g., computerized processing and storage resources are limited).

Some embodiments of the invention may provide a secure and computationally economical decryption protocol, which may improve computerized cryptography technology by shortening computation times and reducing computational resource use in decryption processes (such that, e.g., processes or protocols which rely on noise flooding or other computationally costly techniques may be avoided).

Figure 1:
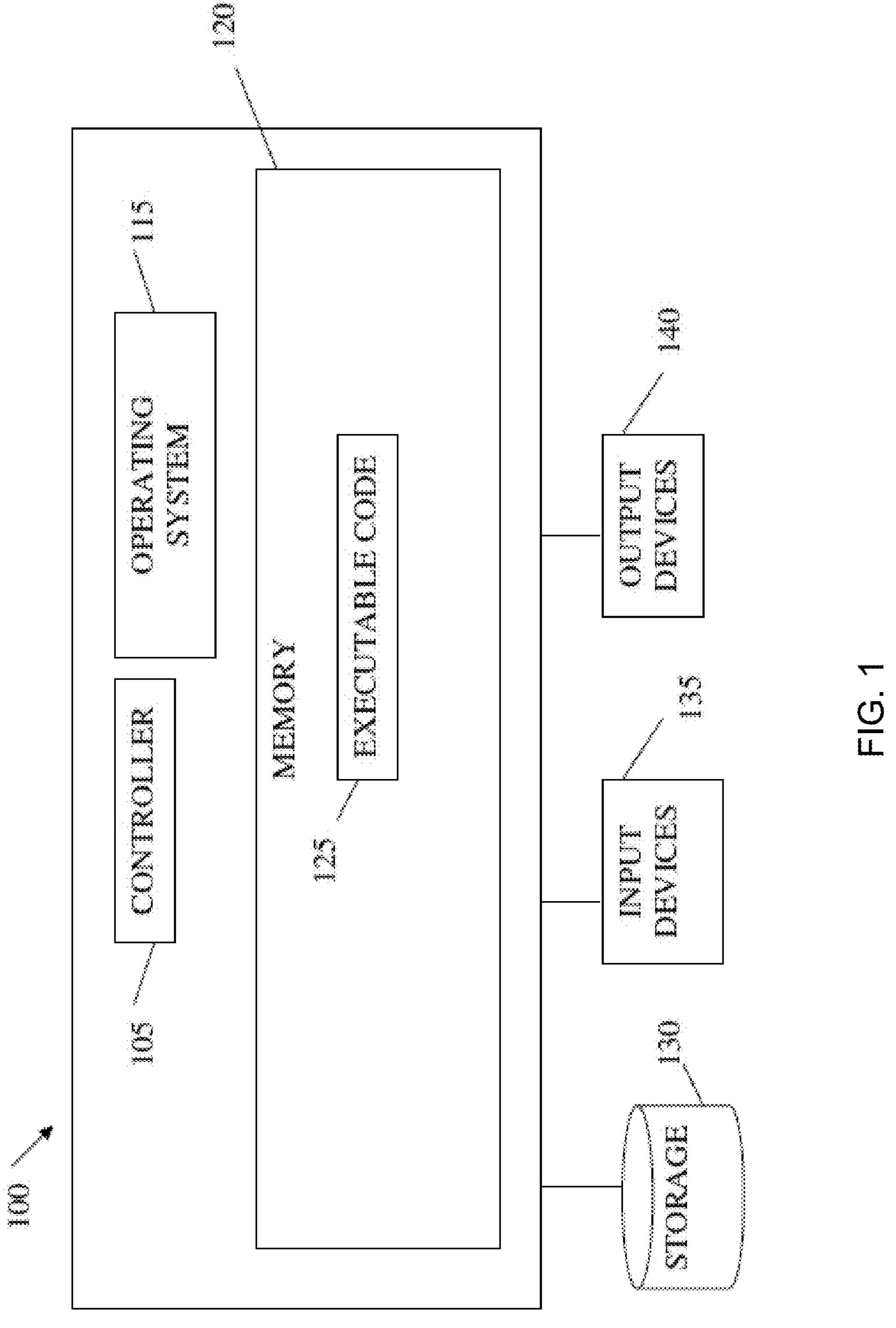
FIG. 1 is a high-level block diagram of an exemplary computing device which may be used with embodiments of the present invention.

FIG. 1 shows a high-level block diagram of an exemplary computing device which may be used with some embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

A computerized data item (such as for example a secret key, a secret random value r, and the like) may be distributed among multiple parties in the form of shares (for example, in binary format, or in a different format). Each share on its own may reveal nothing about the secret item, but when combined with others, it may be used to reconstruct the original data item. For example, suppose r=12345, which may be secret shared among 3 parties as $[r]_1=4000$, $[r]_2=5000$, $[r]_3=3345$. In such manner, no single party knows the value of r, but r may be reconstructed from the individual shares (e.g., in an additive fashion, $[r]_1+[r]_2+[r]_3=4000+5000+3345=12345=r$).

As used herein, a message or plaintext may refer to original computerized data to be encrypted—such as for example a number. A ciphertext may refer to the encrypted version of that message, which hides its content using mathematical operations and a secret key. For example, a plaintext message might be the number 42, and its corresponding ciphertext could be (a, b)=([7, 3, 9], 683), where [7, 3, 9] is a vector of random integers and 683 is computed using mathematical operations on the original message involving the secret key and added noise to hide the original value.

While some example embodiments of the invention may consider computerized data items representing numbers/binary values, other embodiments of the invention may relate to other types of data items or data structures. For example, some embodiments may consider complex data items such as a cryptographic certificate chain represented as a structured object that includes multiple fields such as, e.g., issuer information, subject information, public keys, validity periods, and digital signatures. In some embodiments, the data item may be a serialized JSON object or ASN.1 structure containing nested elements, arrays, and key-value mappings. Various data items may be secret-shared among multiple parties so that no single party can reconstruct the entire certificate chain without collaboration.

As used herein, a party or participant may refer to a computer system, server, or device (including, e.g., the various components shown in FIGS. 1-2) that participates in the encryption or decryption process. For example, each party may hold a share of a secret key and may perform secure computations—e.g., in coordination with other parties—to ensure that sensitive data can be processed without revealing the underlying information to any single participant (e.g., without revealing the entire secret key to any of the parties, or without exposing any party to shares held by other parties; in other words, shares of the key may not be transmitted or shared among the parties or computer systems over a communication network as part of, e.g., executing a decryption protocol). For illustration purposes, a secret key such as "K3Y" may be split into three additive shares, for example "A1B", "C2D", and "EOX", so that no single party knows the full key. When the shares are combined (e.g., by adding their character codes modulo 256), the original key may be reconstructed (for example by a trusted party such as, e.g., a centralized server trusted by the three parties, or by a different reconstruction protocol (including, e.g., authentication of shares based on a signature, etc.)) and used to encrypt a plaintext like "DATA" into a ciphertext such as "ÎÊÝË" (e.g., via XOR operations, or other bitwise operations where each character's numeric code may be compared with the key's code to produce ciphertext. XOR, for example, determines that if the bits differ, the result is 1; if they are the same, the result is 0). A decryption process may apply, e.g., the same key to the ciphertext (e.g., applying XOR again with the same key to reverse the encryption process), restoring the original plaintext without ever exposing the full key to any single participant. Different encryption schemes (where, e.g., a decryption key may be different from the encryption key, etc.) may be used in different embodiments of the invention.

As part of performing secure computations, the parties and/or additional computer systems may communicate by transferring or transmitting computerized data/information items (such as for example decryption shares or modified transmission shares) over a data/communication network.

Figure 2:
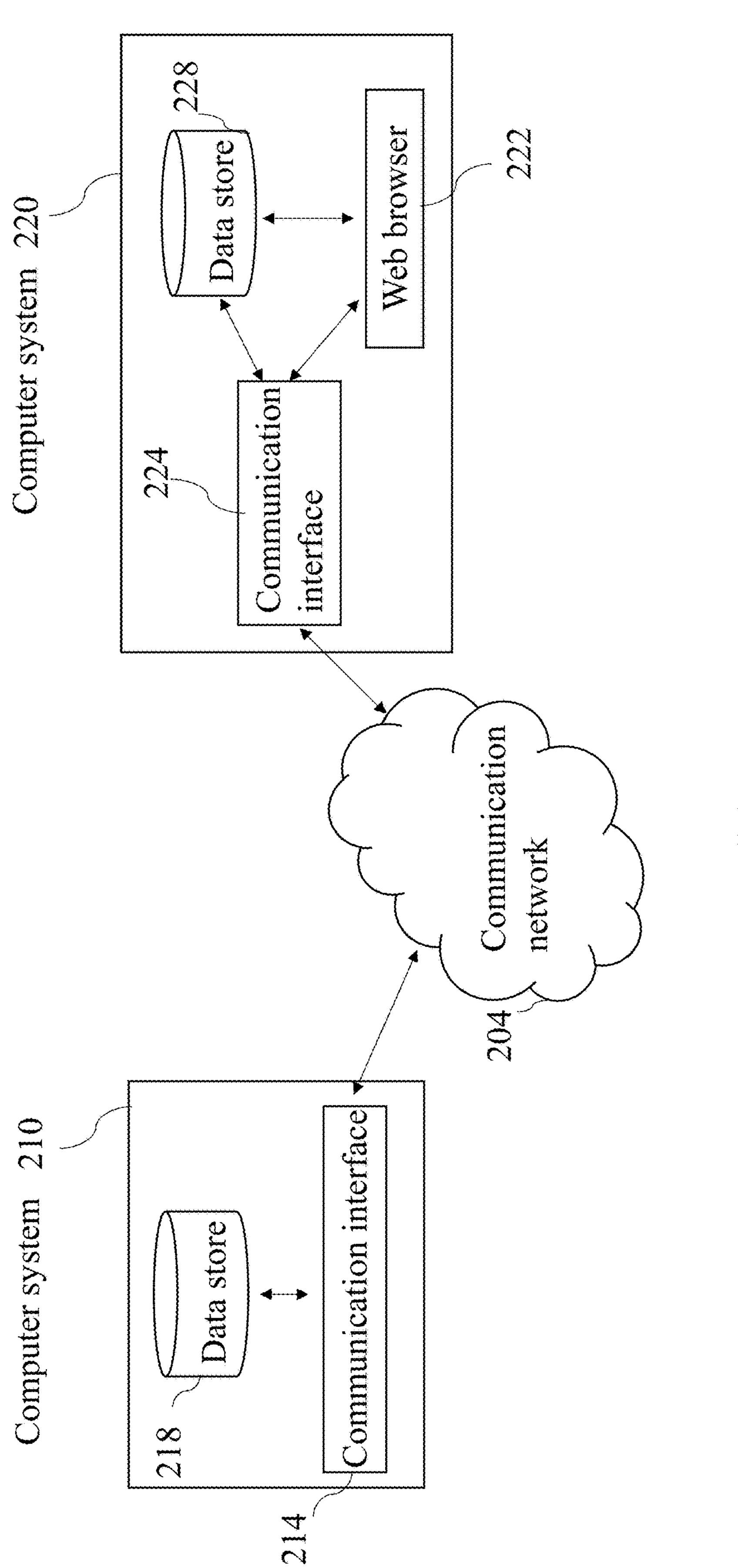
FIG. 2 shows example computer systems remotely connected by a data network according to some embodiments of the invention.

FIG. 2 shows example computer systems remotely connected by a data network according to some embodiments of the invention.

Some embodiments of the invention may include performing an exchange of data or data transfer between remotely connected computer devices or parties. For example, remote computer 210 may send or transmit, over communication or data network 204, computerized data items, data elements, or data points of information (such as for example a decryption share, a modified or masked decryption share, shares of bit representing a less-than-zero operation, or an index of a less-than-zero or less-than-R table, and the like)—to computerized system 220, and/or vice versa (which may, e.g., aggregate or combine a plurality of shares to recover or decrypt a message or plaintext). Each of systems 210 and 220 may be or may include the various components described with reference to system 100, as well as other computer systems or devices, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

In some embodiments of the invention, computer systems or devices 210 and 220 may communicate via data or communication or data network 204 via appropriate communication interfaces 214 and 224, respectively-which may be for example NICs or network adapters as known in the art, and/or using a web browser 222. Computerized systems 210 and/or 220 may include data stores such as, e.g., 218 and 228 which may for example include a plurality of received data items, messages, requests, reports, and the like, such as for example described herein.

Figure 3:
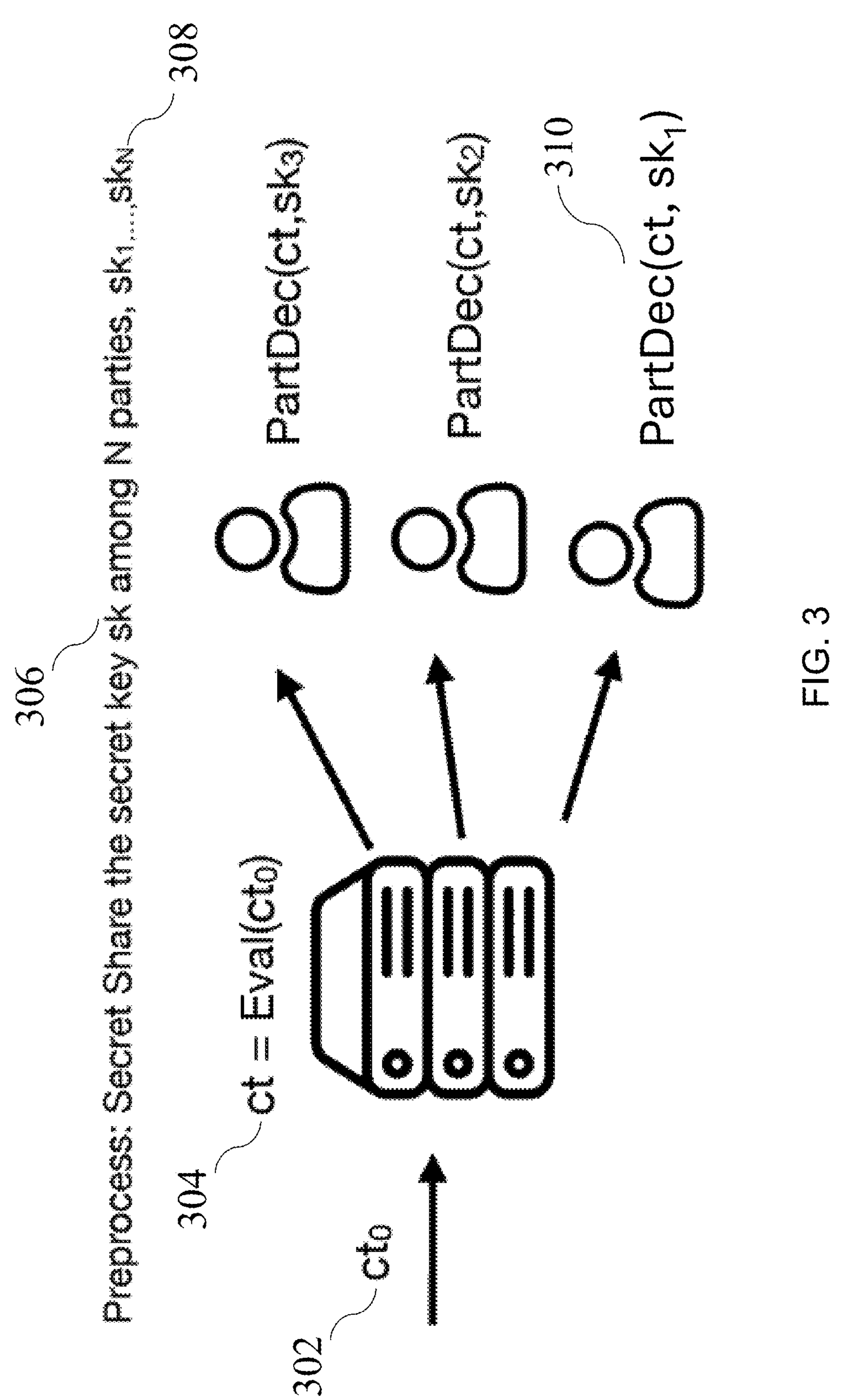
FIG. 3 illustrates some example features of Fully Homomorphic Encryption (FHE) according to some embodiments of the invention.

FIG. 3 illustrates some example features of Fully Homomorphic Encryption (FHE) according to some embodiments of the invention.

An encryption scheme may be fully homomorphic when operations can be performed directly on ciphertext without decrypting it, and the results, once decrypted, reflect the same operations as if they were applied to the original plaintext. For example, in FHE, parties such as, e.g., computer systems/servers may take an encrypted input ($ct_0$ 302) and perform any computations/operations on it without ever decrypting that input-such as, e.g., encrypting the input to produce a new ciphertext (ct 304) that still conceals the original data and retains its information content.

Secure cryptographic protocols according to some embodiments of the invention may be executed by a set of computer systems or devices, where each computer system stores a respective private share of a set of shares of a secret decryption key. For example, in a class of decryption processes referred to herein as threshold protocols or a "threshold setting", a secret decryption key sk 306 used for producing the new ciphertext ct 304 may be split among multiple parties (e.g., as private decryption key shares $sk_1$ to $sk_n$ 308—where each party stores and keeps its respective share hidden from the rest of the parties), so no single party can decrypt alone, and a sufficient subset of these parties (e.g., at least n parties where $n<N$ and where N is the number of secret key shares) must collaborate to reconstruct or recover the decryption result, ensuring security and fault tolerance without relying on a single trusted entity.

In some embodiments, each computer system may compute a decryption share of the encrypted message using its respective private share of the secret decryption key. Each party may use its private key share to compute a partial decryption, or a decryption share (e.g. PartDec) 310 of encrypted message ct 304, and these partial results or shares may later be combined or aggregated to reveal/recover the underlying message (e.g., $ct_0$ 302, being itself FHE encrypted). The ciphertext $ct_0$ 302 may support computation while remaining encrypted, enabling privacy-preserving processing even before threshold decryption happens.

For example, suppose a message $ct_0$ encrypts the value 42 under a threshold scheme with a secret key split into three private key shares $sk_1=101$, $sk_2=202$, and $sk_3=303$. Each party may use its private key share in a modular exponentiation step—e.g., $ds_1=ct_0\hat{}sk_1 \bmod 97=15$, $ds_2=ct_0\hat{}sk_2 \bmod 97=10$, $ds_3=ct_0\hat{}sk_3 \bmod 97=17$—and combining or aggregating these decryption shares (e.g., 15+10+17 mod 97=42) may reveal or reconstruct the original message without exposing the full key to any party (in other words, shares of the key may not be transmitted or shared among the parties or computer systems over a communication network as part of, e.g., executing a decryption protocol). Additional or alternate operations (e.g., multiplication by the secret key or its shares instead of expatiation, etc.) may be used in different embodiments.

Operations such as receiving key shares/encrypted messages/cyphertexts or revealing/aggregating shares would require communication among the different computerized parties, e.g., via transmissions over a communication network. Some embodiments of the invention may use cyphertexts, or encrypt plaintext messages using an FHE scheme, e.g., as a basis for various multi-party computation operations.

FHE may enable a wide range of secure computation applications. In certain implementations, FHE allows a party or client holding one or more secret inputs to outsource computation to an untrusted server without revealing the underlying data. For example, the client may encrypt the data using an FHE scheme, transmit the encrypted data to the server, and the server may evaluate a function directly over the encrypted inputs without learning any information about the plaintext. After computation, the server may return an encrypted output to the client, who can then decrypt and obtain the result.

This concept may be extended to multiple parties wishing to securely compute a function over their joint private inputs. This approach is commonly referred to as secure multiparty computation (MPC). Certain embodiments may leverage FHE for MPC with only a constant number of rounds and low communication complexity. A nonlimiting example MPC process or protocol using FHE is provided in Table 1:

TABLE 1

| A plurality of parties, each holding a private input $x_i$, may wish to compute a function $F(x_1, \ldots, x_n)$ |
|---|
| The parties may jointly generate an FHE key pair: including a private decryption key that may be private- or secret-shared among the parties, as well as a public encryption key that may be available to all parties and may be used to encrypt data or perform homomorphic operations on ciphertexts. |
| Each party may encrypt its input as $x_i' := E_{pk}(x_i)$ and may transmit the encrypted input to an untrusted server (which may optionally be one of the parties). |
| The server may compute $y' := F(x_1', \ldots, x_n')$ and send the encrypted result to all parties. |
| The parties may execute a threshold FHE decryption protocol on y' using their respective shares of the private key to obtain the plaintext result y. |

Additional or alternative protocols may be used in different embodiments.

Some embodiments may consider encrypted messages such as, e.g., ciphertexts generated using a Learning With Errors (LWE) encryption scheme.

Learning-With-Errors (LWE) encryption may refer to a cryptographic scheme based on the hardness or high computational complexity of solving noisy linear equations over finite fields. In an LWE system, a message or plaintext may be encrypted into a ciphertext—for example using a public encryption key derived from a secret key hidden behind random "errors" (noise). For decryption (which may be a threshold decryption operation within the FHE scheme such as, e.g., final operation in Table 1), that secret key may be split into multiple parts or shares—where each party or computer system may hold a private share of a set of shares of a secret decryption key. When decrypting, each party may use their private key share to compute a decryption share, which may refer to a partial result that does not reveal the full decrypted message. These decryption shares may then be aggregated to reconstruct or recover the original message or plaintext. The security of LWE lies in the difficulty of recovering the secret key from the noisy shares, even when the ciphertext is known.

Some nonlimiting examples herein use binary representation, which expresses numbers as sequences of 0s and 1s, where each position corresponds to a power of 2, with the leftmost bits being the most significant (largest values) and the rightmost bits being the least significant (smallest values).

In some LWE encryption schemes, the ciphertext may be expressed as a pair (a, b) where a is a vector of random integers, and b may be computed as:

$$b = \langle a, sk \rangle + m * L + e \bmod q \quad \text{(eq. 1)}$$

Where <a, sk> is the dot product of a and the secret key sk; m is the plaintext message; L is a scaling factor that shifts m into higher bits; e is a noise term; and q is the modulus. In other words, a is randomly chosen, and b is computed using a, the secret key, the message, and added noise—all modulo q to keep values bounded. This structure may hide m securely while allowing homomorphic operations.

Under LWE, the plaintext message m may be multiplied by the scaling factor L so its value occupies the most significant bits of b, leaving room for a comparatively small amount of noise e in the lower bits. This may ensure that the message can be correctly recovered during decryption despite the added noise. In this context, the "most significant bits" (MSB) may, for example, refer to the bits at the leftmost side of a binary number, representing the largest place values (e.g., in 101101, the first 1 is the MSB because it corresponds to the highest power of 2).

For example, let m=2, L=30, and q=256; without scaling, m=2 in binary is 00000010, but multiplying by L gives m×L=60 (binary 00111100), which shifts the message into the most significant bits of b. If <a, sk>=106 and e=1, then b=106+60+1=167, which in binary is 10100111, where the upper bits 1010 are dominated by the scaled message contribution and the least significant bits 0111 contain the small noise and residual terms, ensuring the message remains recoverable.

Figure 4:
FIG. 4 illustrates an example of a Learning-With-Errors (LWE) encryption scheme according to some embodiments of the invention.
Figure 4:
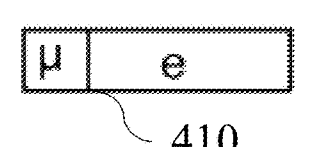
Figure 4:
Figure 4:
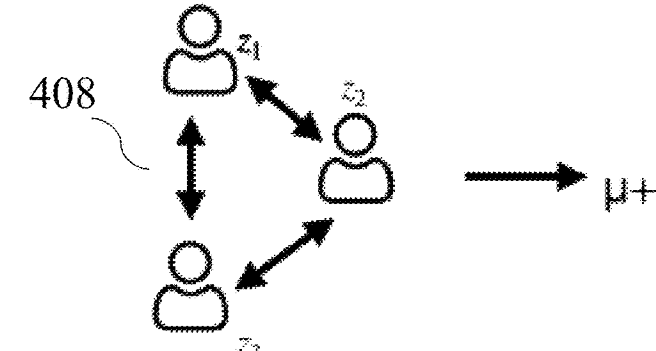

FIG. 4 illustrates an example of a Learning-With-Errors (LWE) encryption scheme according to some embodiments of the invention.

This drawing illustrates how a basic LWE encryption and decryption process works, and why a naive threshold approach is insecure. It shows that a message u 402 may be encrypted into a ciphertext (a, b) 404, where a is a random vector and b is computed using the secret key, the message, and a noise term (e), similar to eq. 1.

In some embodiments, each party may hold a private share of the secret decryption key, and may compute a decryption share of the encrypted message or cyphertext using the private share of the secret decryption key. Specifically, using the share of the secret decryption key, each party may perform or compute a partial decryption, producing a partial decryption share [μ+e] 406 that still contains noise. When these partial results or decryption shares are aggregated or combined to recover the original, decrypted message or plaintext (see, e.g., element 408, where different decryption shares z1, z2, z3 are aggregated among parties), the message plus noise 410 may be revealed, which may leak information about the secret key (as the noise was used to hide that key). FIG. 4 thus illustrates that simply aggregating these decryption shares without additional protections may be insecure.

To mitigate this, some protocols may employ noise flooding, which introduces additional randomness to mask the noise e. The parties may jointly (and privately) generate a noise factor e' large enough to hide e but small enough to preserve message recoverability. While effective, noise flooding can be computationally inefficient, and require significantly larger parameters or weaker security assumptions. For example, some protocols may use bootstrapping and polynomial parameter increases, but may incur high computational costs, as each single decryption may take hundreds of milliseconds even on large multi-core servers with full parallelism.

Some embodiments may secure decryption protocols while avoiding noise flooding by securely removing noise before revealing decryption shares or shares of the decrypted message. To this end, some embodiments may employ MPC techniques to ensure minimal or no information about noise e is revealed. In various encryption schemes (e.g., LWE) it is given that:

$$[y] := [\mu + e] \quad \text{(eq. 2)}$$

and the message and noise occupy distinct segments of y (e.g., message in higher-order bits, noise in lower-order bits). For instance, as part of LWE encryption, the plaintext message may be scaled by a large factor (e.g., $L=2^l$, where l ("ell") is a number of "least significant bits" that are assumed to contain noise) and added to a noise term e, resulting in a ciphertext where the message occupies the higher-order bits and the noise resides in the lower-order bits. Removing noise may then be achieved by truncating y using MPC. This may simplify security by focusing on this truncation, which may also be referred to as MPC rounding, rather than on noise distribution, enabling security without resorting to undesirable assumptions.

As used herein, an "offline phase" may refer to input independent-operations-such as for example preparing lookup tables for sign evaluation (Sign; e.g., evaluating whether an expression such as a bit/digit minus r or a share of r is positive, negative, or zero) and lower-than-zero (LTZ) tables (also referred to as "gates"; see below). An "online phase", on the other hand, may begin once a ciphertext is available, and once the cyphertext or information derived from it needs to be shared between different parties or computer systems. In the online phase, computer systems may use precomputed materials (e.g., Sign and LTZ tables), e.g., to securely extract and remove noise from the decrypted value, enabling fast and secure recovery or reconstruction of the plaintext message.

Achieving MPC rounding using secure comparison operations according to some embodiments may prove more computationally costly than desired (and may require, e.g., O(log q) rounds and secure multiplications—where q is the ciphertext modulus in eq. 1). To further lower the computational cost, some implementations may employ an MPC protocol for secure comparison that constructs preprocessed lookup tables (such as, e.g., tables representing a decomposition of a lower-than-zero function, which may also be referred to as sub-gates) as part of an offline phase. In an online phase, MPC rounding may then require only 2-3 rounds and/or reveals (namely, only two more rounds where each party reveals their corresponding share—being added to the number of such rounds in previous systems and methods where no MPC rounding procedures are performed). This may significantly reduce latency and communication overhead and improve throughput compared to existing decryption processes and protocols. In some embodiments, the offline phase may be optimized to ensure minimal overhead, while the online phase may require only a small number of rounds and minimal communication.

Some embodiments may provide a LWE-based threshold decryption scheme that achieves simulation security in the malicious setting (namely, when some parties may behave maliciously by deviating from the protocol, attempting to learn other parties' secret shares, or influencing the computation to compromise correctness or privacy). Certain implementations may operate on elements over a group ring, while avoiding costly noise flooding by applying an MPC-based rounding technique during decryption.

Some example technology improvements that may be provided by certain embodiments are provided in Table 2:

TABLE 2

| |
|---|
| High Efficiency: Some embodiments may provide an efficient simulation-secure threshold FHE decryption protocol in malicious settings. Compared to previous systems and methods, some implementations may provide: |
| Approximately 50 times lower latency in networks with 1 millisecond (ms) ping time. |
| Approximately 5,000 times the throughput of prior approaches. |
| Dishonest Majority Security: In some embodiments, the protocol may provide active security with abort in dishonest majority settings, which may be stronger than prior approaches that require an honest majority. For example, message authentication codes (MACs) may be used to ensure detection of any cheating. |
| Robustness in Super-Honest Majority: Certain embodiments may support robust execution in a super-honest majority setting. |
| Efficient MPC Gates: In some implementations, the protocol may include optimized MPC gates for modular reduction (Mod), less-than comparison (LT), and sign evaluation (Sign) during the online phase, with moderate offline overhead. These gates may also be useful for other MPC applications, such as secure machine learning. |

Figures 5, 6:
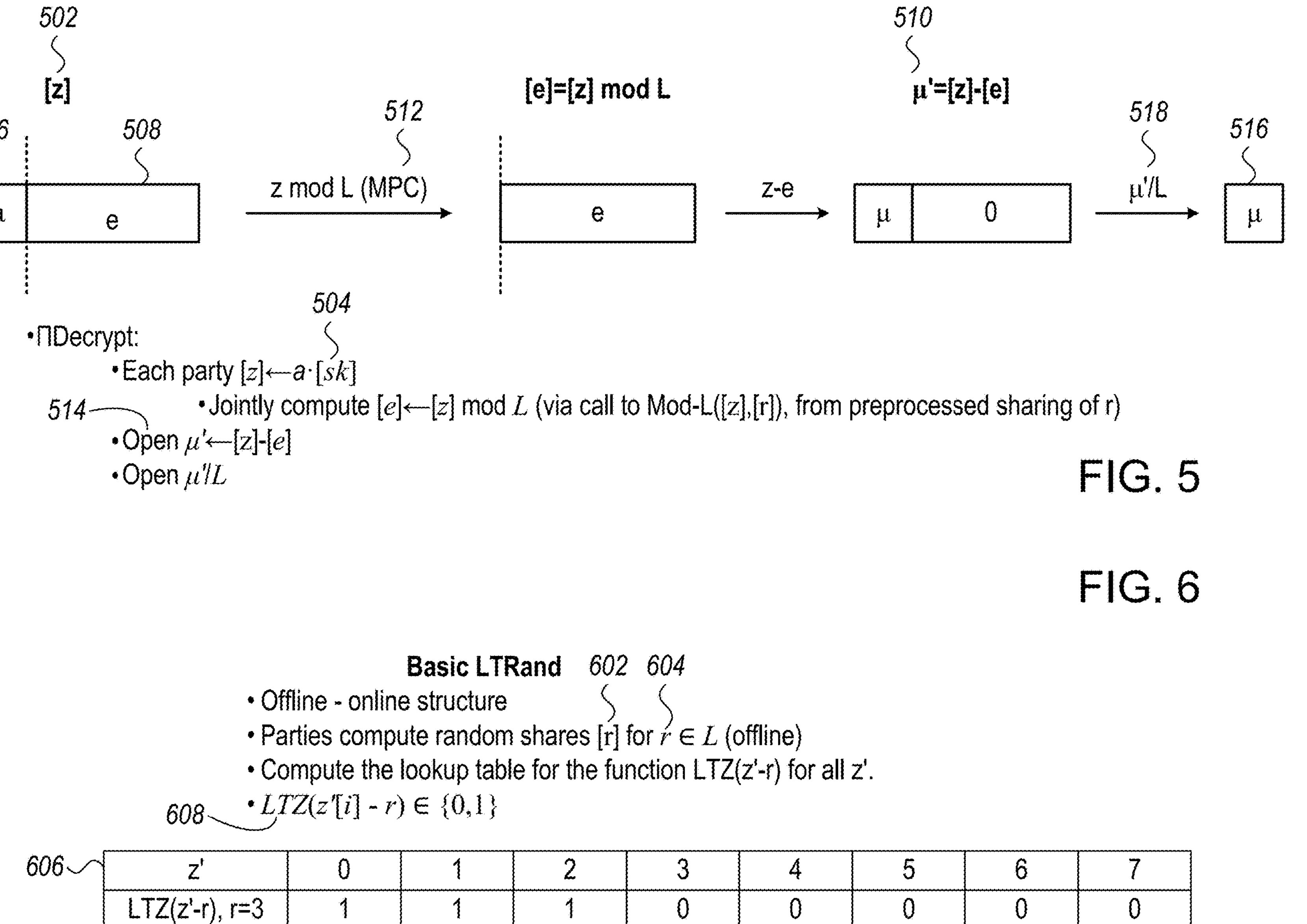
FIG. 5 illustrates an example secure decryption process according to some embodiments of the invention.
FIG. 6 shows an example process for multi-party-computation (MPC) rounding according to some embodiments of the invention.

FIG. 5 illustrates an example secure decryption process according to some embodiments of the invention.

In an example secure threshold decryption process for an encrypted message (which may be, e.g., an LWE protocol—see, e.g., FIG. 4), each computer system may first compute a decryption share ([z] 502) using its private share of the secret key ([sk] 504). [z] 502 may include a part/share of original message [μ] 506, as well as a noise part or noise share [e] 508.

Instead of revealing this noisy value (and in order not to reveal information about the noise, and consequently about sk), each computer system may compute a modified decryption share ([μ']=[z]−[e], element 510) by removing the noise share ([e] 508) from the decryption share ([z] 502)—for example through a secure MPC step 512 (without exposing noise shares or transmitting noise shares among the parties, over the network, etc. in other words, in some embodiments, noise shares and/or unmasked shares that include noise terms are not transmitted or shared among the parties or computer systems over a communication network as part of, e.g., executing a decryption protocol).

According to some embodiments, noise shares may not be transmitted among the computer systems (e.g., over the network): since noise is stripped away securely (e.g., according to ([μ']=[z]−[e]) before aggregating shares, noise shares are not exposed or shared among the parties or never leave the local machines, preventing information leakage.

Finally, at least some computer systems may recover the decrypted message by aggregating a plurality of the modified decryption shares (opening or aggregating [μ'] shares 514, e.g., in a threshold setting), which may recover, produce or output the clean/decrypted message μ 516 (e.g., after dividing by a scaling factor L 518). Additional or alternative operations or processes steps may be carried out by different embodiments.

Different embodiments of the invention may use various reconstruction schemes as part of aggregating or opening decryption shares. These may include, for example, a simple additive combination of shares, Shamir's Secret Sharing reconstruction, as well as additional or alternative advanced threshold cryptographic techniques.

Some embodiments may provide a secure noise removal process, e.g., in a threshold setting—which may include and/or be implemented using modular reduction operations and digit-wise comparison in an MPC scheme.

An LTZ function may represent modular reduction because it interprets a value stored modulo q in its signed range [−q/2, q/2] to check if it is negative. For example, if q=100, the number −3 is stored as 97 mod 100. LTZ (or an equivalent less than r, or LTR function) sees 97 and may determine that any value >50 belongs to the negative zone, so it may output 1 (negative) instead of revealing the actual number. This way, LTZ converts the modular representation back into a signed interpretation securely, which is why it acts like modular reduction in MPC. This process is secure because LTZ may operate entirely on secret-shared values without revealing the actual number to any party. Each party may only hold a random share of the input modulo q, and the LTZ protocol may use precomputed tables or secure comparison techniques to output shares of a single bit (0 or 1) indicating whether the signed interpretation is negative. In some embodiments only random shares of the bit are revealed. This may ensure that even though modular reduction is performed implicitly, the underlying value remains hidden, preserving privacy in MPC.

For instance, suppose a modulus q=101, and suppose a secret-shared value r=(−4), which may be stored as 97 mod 101. Three parties may receive random shares: $P_1$=30, $P_2$=50, $P_3$=17 (sum mod 101=97). None of them knows the actual value of r because each share looks random. An LTZ protocol may use a precomputed table (which may be prepared prior to the secret sharing of r among the parties) to interpret modular values in the signed range [−50, 50], such as for example Table 3:

TABLE 3

| Value mod q | Signed interpretation |
|---|---|
| 0 | 0 |
| 50 | 50 |
| 51 | −50 |
| 97 | −4 |
| 100 | −1 |

Since 97 maps to −4, LTZ may output 1 (negative) without revealing the original number r, ensuring security because only the sign bit is disclosed while the true value of r remains hidden. Some embodiments may use modulus values (q) that are powers of 2, but other choices of the modulus may be used in different embodiments.

According to some embodiments, the removal of the noise share may include, by each computer system of the set of computer systems, masking the decryption share to produce a masked share. For example, each computer system may mask or hide its decryption share [z] with a share [r] of a random value r, producing a masked share [z']=[z]+[r]. This masking may ensure that the true value of decryption share [z] remains hidden.

For example, assume three parties attempt to jointly decrypt a value z=42 mod q, where q=101. Each party holds a secret share of z: $P_1$=10, $P_2$=15, $P_3$=17 (sum mod 101=42). To hide or mask its decryption share, each party may also hold a share of a random value r=30, split as $P_1^r$=8, $P_2^r$=12, $P_3^r$=10 (sum mod 101=30). Each party may compute its masked share z' by adding its own shares: $P_1'$=10+8=18, $P_2'$=15+12=27, $P_3'$=17+10=27. The masked shares thus sum to (18+27+27) mod 101=72, which equals z+r mod q (42+30=72).

LTR (Less Than r) may refer to an MPC gate or a precomputed/preprocessed component that determines whether a value (such as, e.g., a public value) is smaller than a private value that may be secret-shared among multiple parties. Specifically, it may compute the bit result of a comparison z'<r, where z' is a masked value and r is a secret-shared random value.

Some embodiments may determine whether different bits in z' (e.g., resulting from masked shares [z']) are smaller than r using a LTR or an equivalent LTZ (Less-Than-Zero) function via MPC, which may evaluated through a precomputed lookup table or tables indexed by the digits or bits in z' (where, for example, each masked decryption share [z'] may be indexed differently such that the information in z' or z is maintained). Each digit comparison may contribute to the overall sign/value computation on z', and the outputs of all comparisons may be aggregated securely via an MPC protocol to effectively compute the modular reduction [e]=[z] mod L. This process may strip away the lower 1 bits (where the noise resides) in a masked decryption share while preserving the higher-order bits that encode the message. By performing this in MPC, no party learns the actual masked values, ensuring privacy and correctness in the decryption pipeline. In some embodiments, only the least significant bits of each [z'] are used to compute whether z' is smaller than the random value, and a noise share [e] may be removed from [z] by computing [e]=[z']−[r]+L*[μ] (mod L), for these bits—where [u] may be derived through a secure comparison using lookup tables.

A modular reduction process or operation may isolate the lower 1 bits or least significant bits (noise) from the higher m bits (message) by accounting for two cases and computing u accordingly, e.g.:

$$\text{Case 1: If a value/bit in } z' - r \geq 0, \text{ then } u = 0 \text{ and the relevant a value/bit in } [e] = [z'] - [r] = [z] \bmod L. \quad \text{(eq. 3)}$$

$$\text{Case 2: If a value/bit in } z' - r < 0, \text{ then } u = 1 \text{ and the relevant a value/bit in } [e] = [z'] - [r] \text{ is of the set of values } [-L, 0]. \quad \text{(eq. 4)}$$

Based on the calculation of noise shares [e], each party may compute [μ']=[z]−[e], removing the noise share [e] from decryption share [z] (note [z] shares were computed by each party prior to the masking process producing [z']), and the message or plaintext bits may be recovered or reconstructed securely after aggregation of modified decryption shares [μ'] shares.

FIG. 6 shows an example process for multi-party-computation (MPC) rounding according to some embodiments of the invention.

Some embodiments of the invention may securely strip or remove noise during decryption using, e.g., modular reduction and bit-level operations performed via MPC. According to some embodiments, each computer system may first mask its decryption share by adding a share [r] 602 of a random value r 604 to it, producing a masked share that hides the original noisy share [z]. Then, the computer systems may use lookup tables (e.g., lookup table 606) for the LTZ (Less-Than-Zero) function 608, and may check, using a secure MPC protocol or process, whether values of z within the masked share [z'] minus the random value r is negative (results of this check may be stored as a binary variable, e.g., 1 if [z']−r is negative, and 0 otherwise). In some embodiments, a lookup table or tables may be precomputed for all possible masked values of digits in z' (e.g., z'=0, 1, 2, . . . ) and may indexed by the bits of the masked share. The outputs from these tables may be aggregated using a secure MPC protocol or process, allowing the parties to jointly compute whether the original value is below a threshold and thus perform modular reduction (e.g., computing [z] mod L). This step may effectively isolate the noise bits from the message bits without revealing the noise shares, enabling the message to be recovered securely while preserving privacy.

According to some embodiments, some offline operations (which may be or may include computation operations by the parties before the ciphertext and/or masked cyphertext is received and/or is transmitted e.g., over a communication network) may include generating a random mask value r (and/or its shares) and precomputing lookup tables for comparison functions, while some online operations (requiring communication among parties) may include, e.g., using those tables with masked decryption shares in a secure MPC protocol or process to perform modular reduction operations and remove the noise (including, e.g., computing u to remove or strip different noise bits in [z']).

Figures 7, 8:
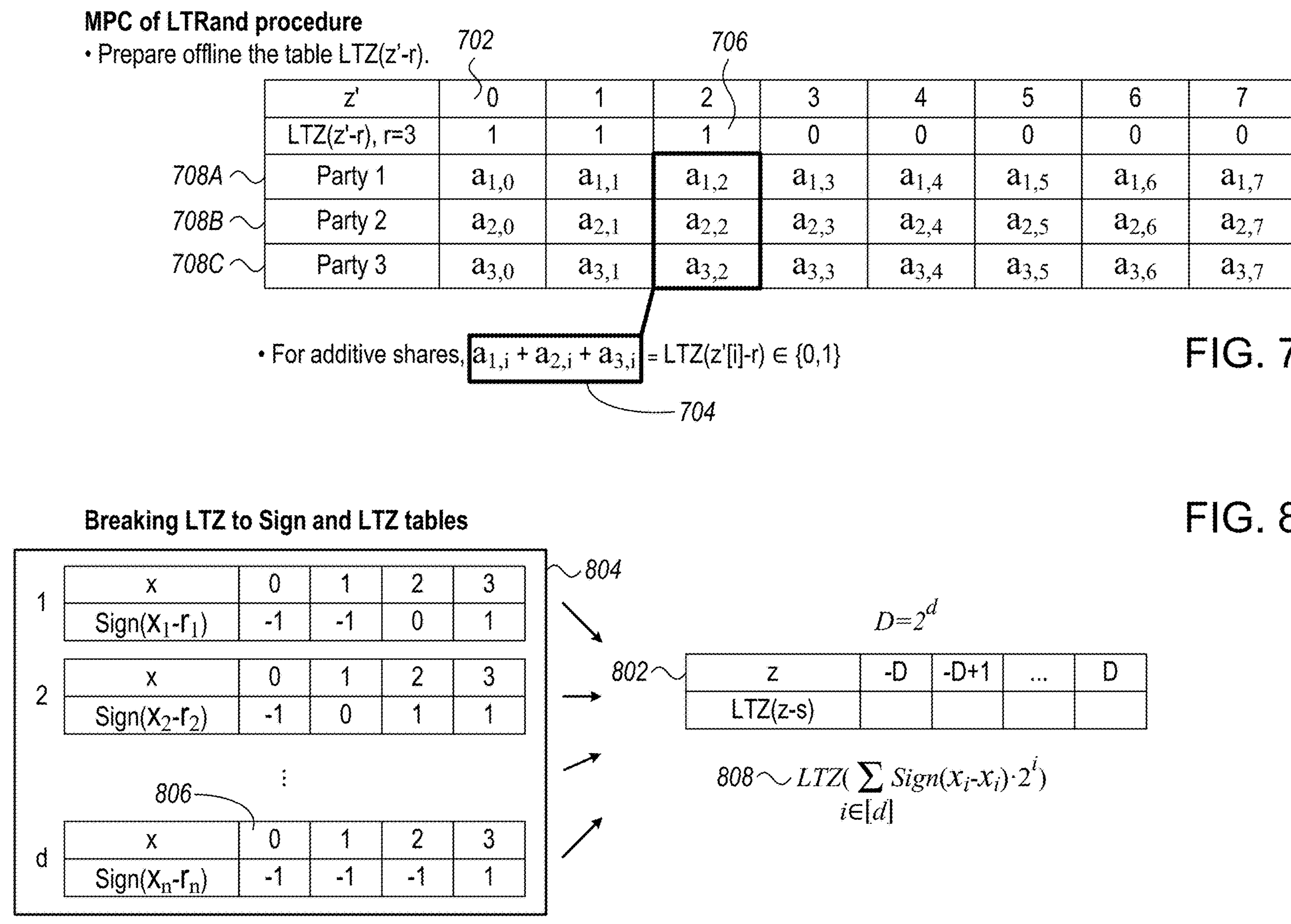
FIG. 7 illustrates an example lookup table based noise removal process using multi-party computation according to some embodiments of the invention.
FIG. 8 shows an example decomposition of a lookup table into sign and smaller tables according to some embodiments of the invention.

FIG. 7 illustrates an example lookup table based noise removal process using multi-party computation according to some embodiments of the invention.

Some embodiments may include aggregating outputs from one or more lookup tables based on the masked shares using a secure MPC protocol. In some embodiments, the aggregated outputs are computed for each of a plurality of bits, the plurality of bits comprised in the masked share.

For example, secure noise removal protocol according to some embodiments of the invention may securely determine whether a masked value of z' is less than a random value r (of which shares [r] were distributed among the parties) using aggregation of shares and a lookup table(s). In some embodiments, a lookup table including outputs for the LTZ (Less-Than-Zero) function—which may represent or may be used in an MPC modular reduction operation—may be computed for each possible value of a bit/digit (e.g., bit or digit 702) of the plurality of bits/digits in z' (which may be indexed as 0, 1, . . . , n−1 for n bits) based on outputs of a lookup in a table at a public index of z'. Each party may follow this protocol or procedure to receive a share of an LTZ value in the table, e.g., for a specific index. Some embodiments may perform comparison operations between each of a plurality of the bits/digits in [z'] and r by each of the parties. Outputs of these comparisons computed for each of the plurality of bits in [z'] may then be aggregated across all parties: for example by adding (element 704) or combining outputs from the parties 708A-C using a secure MPC protocol (e.g., via a threshold MPC protocol or process, such that, e.g., only if N or more parties 708A-C computed a negative value, or u=1, for a digit or bit z' based on, e.g., respective shares of [r], then the final result for that bit/digit may be set to u=1; element 706). This summed or aggregated result may reveal whether the original masked value is below the threshold, enabling modular reduction without exposing the actual shares or noise, and ensuring privacy throughout the process (see also Tables 4-7).

In some embodiments, multiple or a plurality of lookup tables may be generated or prepared because each digit or bit in a masked decryption share [z'] may be compared independently against the corresponding digit or bit of the random mask share [r], and each comparison may depend on the possible values within a range of size L (where L represents the scaling factor in an LWE encryption used to separate the message from the noise in the decrypted value). Since L=21 can be large (e.g., $2^8$=256), storing a single table for all possible comparisons may prove computationally formidable. Instead, some embodiments may break the comparison into smaller digit- or bit-wise operations, each using a lookup table of size B=L/d, allowing efficient and parallel evaluation while preserving privacy in MPC.

In some embodiments, one or more or a plurality of lookup tables may be generated by decomposing a Less-Than-Zero (LTZ) function or table, where each lookup table of the one or more lookup tables comprises shares of sign function outputs.

For example, consider a modulus q=101, let x=73 and r=50. Both may be represented in base-10 digits: $x_1$=7, $x_2$=3; $r_1$=5, $r_2$=0. Instead of one large LTZ table for x-r (or [z']-r), LTZ may be decomposed into two smaller "sign" lookup tables storing shares of sign outputs for each digit or bit difference: $(x_1-r_1)=(7-5)=2\rightarrow$sign=+1; $(x_2-r_2)=(3-0)=3\rightarrow$sign=+1. The LTZ result may then be reconstructed, for example, by combining or aggregating these outputs with weights (such as for example powers of 2 or decimal weights, e.g., 10, 1): LTZ_index=($sign_1$*10)+($sign_2$*1)=(+1*10)+ (+1*1)=11, which may correspond to "positive" in the lookup logic. This decomposition may avoid storing a single, massive (e.g. in terms of memory size) table for all possible x_i−r values for every possible value of x (or [z']−r values; e.g., without further decomposition of r into multiple shares), yet securely computes LTZ from digit-wise sign shares.

FIG. 8 shows an example decomposition of a lookup table into sign and smaller tables according to some embodiments of the invention.

For example, a Less-Than-Zero (LTZ) function and/or lookup table 802 may be decomposed into a plurality of lookup tables 804 storing shares of sign function outputs, which indicate whether each bit or digit difference, or the difference between each bit or digit in [z'] and [r], $(x_i-r_i)$ is negative, zero, or positive (where $x_i$ may be a bit or a digit in a numeric representation of [z'], e.g., a base-10 representation; see, e.g., bit or digit x_0 806 which appears across multiple sign lookup tables 804). By combining or aggregating these sign outputs across all digits $(x_i-r_i)$ using a weighted sum (of, e.g., powers of 2, according to example expression 808), some embodiments may reconstruct the LTZ result for [z'] without having to rely on storing formidably large tables. In some embodiments, the parties may combine a weighted sum of shares of the sign table values, and the parties may reveal the shares (which include reconstruction), to get a public value or index of the LTZ table (which has been decomposed into the sign tables).

A nonlimiting numerical example of an MPC rounding protocol according to some embodiments of the invention is provided (e.g. in pseudocode) in Table 4:

TABLE 4

Example Parameters
Ciphertext modulus q = 256 (that is, 2^8).
Some embodiments may place the plaintext in the top bits according to a LWE scheme, e.g., using L = 8 (that is, 2^3).
Plaintext = 5.
Noise e = 2.
The “noisy plaintext value” in the low bits may therefore be z = plaintext * L + e = 5 * 8 + 2 = 42 mod 256.
Example Masking setup
A random mask r may be chosen in {0,...,L−1} = {0,...,7}.
Each party may hold an additive share of r (mod L).
The parties may publicly reveal only x = (z + r) mod L (e.g., as a first round/reveal operation).
Internally (under MPC), the parties may form z' = x − r and a single comparison bit u = LTZ(z'), where LTZ may return 1 if the signed value is negative and 0 otherwise (as a second round/reveal operation).
The parties may then compute (still under MPC) e = z' + L * u, remove or subtract e from z to get mu' = z − e, and finally recover or reconstruct the plaintext as mu' / L.
Two nonlimiting example cases (showing two LTZ branches):
Case A: u = 0
1. Choose r = 3.
2. Publicly opened or revealed x = (42 + 3) mod 8 = 5.
3. z' = x − r = 5 − 3 = 2, so LTZ(z') = 0 and u = 0.
4. e = z' + L * u = 2 + 8 * 0 = 2.
5. mu' = z − e = 42 − 2 = 40, and mu' / L = 40 / 8 = 5 (the correct plaintext).
Case B: u = 1
1. Choose r = 6.
2. Publicly opened or revealed x = (42 + 6) mod 8 = 0.
3. z' = x − r = 0 − 6 = −6, so LTZ(z') = 1 and u = 1.
4. e = z' + L * u = −6 + 8 = 2.
5. mu' = 42 − 2 = 40, and 40 / 8 = 5 (the correct plaintext again).

Additional or alternate MPC rounding protocols and operations may be used in different embodiments.

A nonlimiting example MPC rounding process according to some embodiments of the invention is provided (in pseudocode) in Tables 5-7:

TABLE 5

Public parameters
n number of parties
k ciphertext bits
m plaintext bits
b “digit” bits
lwe_d LWE scheme dimension
spdz2k_s SPDZ2k security parameter bits
spdz2k_k SPDZ2k computation ring bits
Derived parameters:
q ciphertext modulus = 2k
p plaintext modulus = 2m
l noise budget = k − m
d number of digits = ceil(l/b)
Learning With Errors (LWE
Share LWE Secret Key
Input:
n number of parties (probably constant)
sk vector of size lwe_d; elements mod q
Output:
n shares of vector of size lwe_d; elements mod q
Pre-processing − e.g., with centralized randomness
Preprocess ModLTZ
Input: None
Output:
s mod 2*D
n shares of LTZ vector of size 2*D with values of {0,1}
Preprocess Sign Table
Input:
None
Output:
r mod L
n shares of Signs table (B rows, (d+1) columns) with values of {−1,0,1}
Online protocol (Centralized)
Notation: [Y] is a random value in range {0, ..., Y − 1}
Decrypt
Input: sk = [sk0, ..., sklwe_d], ctxt_a = [ctxt_a0, ..., ctxt_alwe_d], ctxt_b, r (1 bits)
Compute:

TABLE 5-continued

```
z = ctxt_b − dot_product(ctxt_a, sk) + 2l-1
z' = z + r (mod L)
u = (z' <? r) of {0,1}
e = z' − r + L*u (mod L)
o' = z − e
msg = o' / L
Output: msg
```

Online Protocol—Decentralized

This process presents Party i local computation and messages it sends/receives during each round.

TABLE 6

```
Round 1
Input:
Public c = (ctxt_a, ctxt_b);
ctxt_a = [ctxt_a0, ..., ctxt_alwe_d] (mod q)
ctxt_b (mod q)
ski = [ski,0 , ... , ski,lwe_d] (mod q)
[ri,0 , ... , ri,d−1] (mod q) from preprocessing
Compute:
zi = ctxt_b − dot_product(ctxt_a, ski) + 2l−1 (mod q)
ri = sigma ri,j * B j   (mod q)
z'i = zi + ri (mod L)
Output: z'i share
Round 2
Input:
Shares Z' = [z'1, ... ,z'n] from all parties
Signsi table: B rows, (d+1) columns from preprocessing
si (mod 2*D) from preprocessing
Compute:
z' = Reveal(Z') (mod L) (e.g., a first reveal)
digits = Decompose z' into digits in base B (this may be, e.g., a computation for a bit in
Z', outputting a result of a comparison of a bit in z' with r or [r])
yi = 0
for (idx ,digit) in digits.enumerate( ):
y += 2i*Signsi[idx, digit]
y'i = yi + si (mod 2*D)
Output: y'i share
Round 3
Input:
Shares Y' = [y'1, ... ,y'n] from all parties
z', revealed in round 2
ri, computed in round 1
zi, computed in round 1
LTZi vector, length (d+1)
Compute:
y' = Reveal(Y') (mod 2*D) (e.g., a second reveal)
ui = LTZi[y'] (mod p)
ei = z' − ri + L*ui (mod q)
o'i = zi − ei (mod q)
Output: o'i share
```

TABLE 7

```
Online protocol variables
Secret shares of private key: sk
"Public" input (not secret shared):
a, b - the LWE ciphertext to be decrypted
"Private" input (a secret share for each party):
s and the LTZ table created from it
r and the Signs tables created from it
"Private" variables calculated during execution (not revealed to other parties): z, y, u, e
"Public" variables revealed to other parties (var'): z', y', o'
API functions
set_parameters
input:
n: u8 Number of parties
k: u8 Ciphertext bits
m: u8 Plaintext bits
b: u8 "Digit" bits
lwe_d: u16    LWE elements count
```

TABLE 7-continued

| |
|---|
| spdz2k_k: u8 SPDZ2k bits |
| spdz2k_s: u8 SPDZ2k security parameter |
| output: |
| See derived parameters above |
| get_random_shares(num_shares: u8, modulus: u64+) |
| each party i receives = random_share_i: u64+ |
| share_secret_key(secret_value: u64+, num_shares: u8, modulus: u64+) |
| each party i receives = secret_share_i: u64+ |
| reconstruct_shares(shares: [u64+; n], modulus: u64+) |
| parties jointly compute = secret_value: u64+ |
| create_ltz_table(s: u8) |
| each party i receives LTZ_i vector; size of 2*D; values in u64 |
| create_sign_tables(r: [u8; digits]) |
| each party i receives Signs_i table; size of B rows, (d+1) columns; values in u64 |
| online_decrypt(ciphertext: [u64; 1025], sk_i: [u64; 1024]) |
| parties jointly compute = plaintext: u8 |

Additional or alternative operations may be used in different embodiments.

Some embodiments may execute one or more computer commands or transmit a data packet over the communication network based on the decrypted message.

For example, after aggregating noise-free shares to reconstruct or recover the decrypted message or plaintext, some embodiments may use the plaintext as an instruction set or authentication token to execute computer commands or transmit data packets across a secure network, such as for example initiating a remote database update or triggering an automated action (e.g., granting access to a file or a building). In some embodiments, such actions may not be performed unless the decrypted message or plaintext is provided: for example, access may not be granted to files/a building (e.g., an electronic gate may remain locked, etc.), unless the plaintext is provided as an authentication token, e.g., as a data packet or packets, which may be transmitted over a network to the computer system responsible for executing the action (and capable e.g., of unlocking Additionally or alternatively, the decrypted message or recovered/reconstructed plaintext may be used as a signal that, once received by a computer system, may initiate a machine learning inference pipeline to classify incoming data, trigger automated model retraining on newly ingested datasets, or deploy a pre-trained model to edge devices for real-time detection. In other cases, the decrypted message or plaintext may be used to authorize execution of federated learning rounds across distributed nodes, enable secure gradient aggregation for privacy-preserving model updates, or activate automated hyperparameter tuning workflows in a cloud-based machine learning orchestration system. Additional or alternative automated actions may be used in different embodiments.

Figure 9:
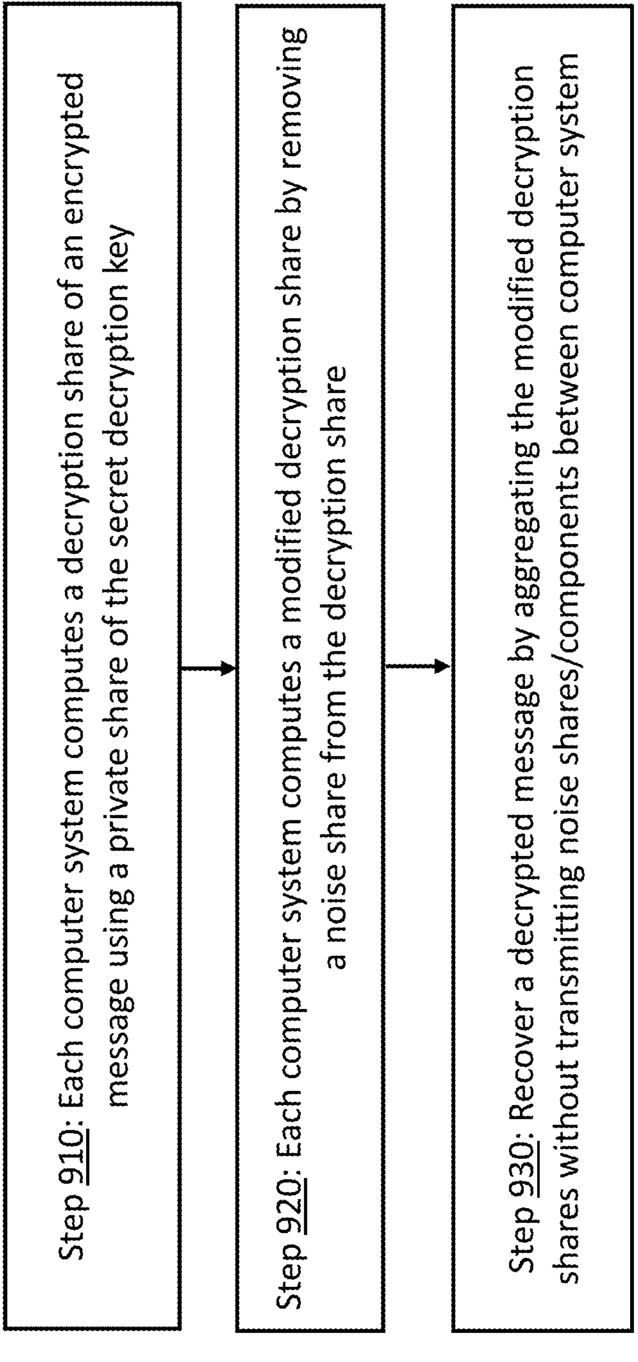
FIG. 9 illustrates an example process of secure decryption of an encrypted message according to some embodiments of the invention.

FIG. 9 illustrates an example process of secure decryption of an encrypted message according to some embodiments of the invention.

Some embodiments may include a set of computer systems, where each computer system stores a respective private share of a set of shares of a secret decryption key (see, e.g., FIGS. 3-4). In operation 910, each computer system may compute a decryption share (e.g., [z] 502 in FIG. 5) of the encrypted message using its respective private share of the secret decryption key (e.g., [sk] 504; FIG. 5). Each computer system may then compute a modified decryption share (e.g., [μ'] 510; FIG. 5) by removing a noise share (e.g., [e] 508; FIG. 5) from the decryption share (operation 920)—which may be done, e.g., via MPC and for example by masking the decryption shares and aggregating outputs from lookup tables (e.g., sign tables 804, produced by decomposing LTZ table 802; FIG. 8) based on masked shares and/or based on shares of a random value r used in masking the shares (e.g., [r] 602; FIG. 6).

Some embodiments may then recover a decrypted message, or the plaintext encrypted in the encrypted message, for example by aggregating a plurality of the modified decryption shares—for example by at least some of the computer systems, in a threshold setting—in some embodiments without exposing or transmitting the noise components shares between computer systems (as each noise share [e] 508 was stripped or removed from or subtracted from its respective decryption share, as in [μ'] 510; in other words, if not masked, the noise shares or components, and/or information about the noise used in LWE encryption, are not transmitted or shared among the parties or computer systems over a communication network as part of, e.g., executing a decryption protocol according to some embodiments of the invention). Thus, recovering the decrypted message may be performed such that modified decryption shares are transmitted among the computer systems over a communication network (e.g., as part of share aggregation or plaintext reconstruction), and noise shares or noise components (which may be included in decryption shares prior to their modification/masking) are not transmitted among the computer systems over a communication network. Additional or alternative operations may be performed in different embodiments.

Some nonlimiting example real world applications of some embodiments of the invention may include the encryption/decryption of electronic communications (e.g. email), digital signature verification, key generation, and the like.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of secure decryption of an encrypted message, the method comprising:

by each computer system of a set of computer systems, wherein each computer system comprises a memory and a processor and stores a respective private share of a set of shares of a secret key:

computing a decryption share of the encrypted message using the private share of the secret key, wherein the decryption share comprises a noise share that, if revealed as part of recovering a decrypted message by aggregating a plurality of the decryption shares, would leak information about the secret key;

computing a modified decryption share by removing the noise share from the decryption share; and recovering, by one or more of the computer systems, the decrypted message by aggregating a plurality of the modified decryption shares, wherein the modified decryption shares are transmitted among the computer systems over a communication network, and wherein the noise shares are not transmitted among the computer systems over the communication network.

2. The method of claim 1, wherein the removal of the noise share comprises:

by each computer system of the set of computer systems, masking the decryption share to produce a masked share; and aggregating outputs from one or more lookup tables based on the masked shares using a secure multi-party computation (MPC) protocol.

3. The method of claim 2, wherein the one or more lookup tables are generated by decomposing a Less-Than-Zero (LTZ) function, and wherein each lookup table of the one or more lookup tables comprises shares of sign function outputs.

4. The method of claim 2, wherein the removal of the noise share comprises a modular reduction operation.

5. The method of claim 1, wherein the encrypted message is a ciphertext generated using a Learning With Errors (LWE) encryption scheme.

6. The method of claim 2, wherein the aggregated outputs are computed for each of a plurality of bits, the plurality of bits comprised in the masked share.

7. The method of claim 1, comprising executing one or more computer commands or transmitting a data packet over the communication network based on the decrypted message.

8. A system for secure decryption of an encrypted message, the system comprising:

a set of computer systems, wherein each computer system in the set of computer systems comprises a memory and a processor and stores a respective private share of a set of shares of a secret key; and wherein each computer system in the set of computer systems is to:

compute a decryption share of the encrypted message using the private share of the secret key, wherein the decryption share comprises a noise share that, if revealed as part of recovering a decrypted message by aggregating a plurality of the decryption shares, would leak information about the secret key;

compute a modified decryption share by removing the noise share from the decryption share; and wherein one or more of the computer systems in the set of computer systems is to recover the decrypted message by aggregating a plurality of the modified decryption shares, wherein the modified decryption shares are transmitted among the computer systems over a communication network, and wherein the noise shares are not transmitted among the computer systems over the communication network.

9. The system of claim 8, wherein the removal of the noise share comprises:

by each computer system in the set of computer systems, masking the decryption share to produce a masked share; and aggregating outputs from one or more lookup tables based on the masked shares using a secure multi-party computation (MPC) protocol.

10. The system of claim 9, wherein the one or more lookup tables are generated by decomposing a Less-Than-Zero (LTZ) function, and wherein each lookup table of the one or more lookup tables comprises shares of sign function outputs.

11. The system of claim 9, wherein the removal of the noise share comprises a modular reduction operation.

12. The system of claim 8, wherein the encrypted message is a ciphertext generated using a Learning With Errors (LWE) encryption scheme.

13. The system of claim 9, wherein the aggregated outputs are computed for each of a plurality of bits, the plurality of bits comprised in the masked share.

14. The system of claim 8, wherein one or more of the computer systems in the set of computer systems is to execute one or more computer commands or transmit a data packet over the communication network based on the decrypted message.

15. A method of computerized decryption, the method comprising:

by each computer device of a set of computer devices, wherein each computer device comprises a memory and a processor and stores a respective share of a set of shares of a secret key:

computing a decryption share of a cyphertext using the respective share of the secret key, wherein the decryption share comprises a noise share that, if revealed as part of reconstructing a plaintext by combining a plurality of the decryption shares, would leak information about the secret key;

computing a modified decryption share by stripping the noise share from the decryption share; and reconstructing, by one or more of the computer devices, the plaintext by combining a plurality of the modified decryption shares, wherein the modified decryption shares are transmitted among the computer devices over a data network, and wherein the noise shares are not transmitted among the computer devices over the data network.

16. The method of claim 15, wherein the stripping of the noise share comprises:

by each computer device of the set of computer devices, masking the decryption share to produce a masked share; and combining outputs from one or more tables based on the masked shares using a secure multi-party computation (MPC) process.

17. The method of claim 16, wherein the one or more tables are generated by decomposing a Less-Than-R (LTR) function, and wherein each table of the one or more tables comprises shares of sign function outputs.

18. The method of claim 16, wherein the stripping of the noise share is performed using a modular reduction operation.

19. The method of claim 15, wherein the cyphertext is generated using a Learning With Errors (LWE) encryption.

20. The method of claim 16, wherein the combined outputs are computed for each of a plurality of digits, the plurality of digits comprised in the masked share.

* * * * *